(12) United States Patent
Bhamri et al.

(10) Patent No.: US 12,532,301 B2
(45) Date of Patent: Jan. 20, 2026

(54) CONFIGURING DEMODULATION REFERENCE SIGNAL BUNDLING AND TRANSPORT BLOCK SCHEDULING

(71) Applicant: Lenovo (Singapore) Pte. Ltd., New Tech Park (SG)

(72) Inventors: Ankit Bhamri, Rödermark (DE); Vijay Nangia, Woodridge, IL (US); Ali Ramadan Ali, Kraiburg am Inn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 371 days.

(21) Appl. No.: 18/261,731

(22) PCT Filed: Jan. 14, 2022

(86) PCT No.: PCT/IB2022/050278
§ 371 (c)(1),
(2) Date: Jul. 17, 2023

(87) PCT Pub. No.: WO2022/153222
PCT Pub. Date: Jul. 21, 2022

(65) Prior Publication Data
US 2024/0114490 A1  Apr. 4, 2024

Related U.S. Application Data

(60) Provisional application No. 63/137,898, filed on Jan. 15, 2021.

(51) Int. Cl.
*H04W 72/0446* (2023.01)
*H04L 5/00* (2006.01)
*H04W 72/1268* (2023.01)

(52) U.S. Cl.
CPC ....... *H04W 72/0446* (2013.01); *H04L 5/0012* (2013.01); *H04L 5/0051* (2013.01); *H04W 72/1268* (2013.01)

(58) Field of Classification Search
CPC ......... H04W 72/0446; H04W 72/1268; H04W 72/23; H04W 72/232; H04L 5/0012;
(Continued)

(56) References Cited

U.S. PATENT DOCUMENTS

2021/0014095 A1  1/2021  Ly et al.
2021/0075571 A1*  3/2021  Manolakos ........... H04W 72/23
(Continued)

FOREIGN PATENT DOCUMENTS

WO  2019051096 A1  3/2019

OTHER PUBLICATIONS

PCT/IB2022/050278, "Notification of Transmittal of the International Search Report and the Written Opinion of the International Searching Authority, or the Declaration", International Searching Authority, Apr. 13, 2022, pp. 1-13.
(Continued)

*Primary Examiner* — Thai Nguyen
(74) *Attorney, Agent, or Firm* — Kunzler Bean & Adamson

(57) ABSTRACT

Apparatuses, methods, and systems are disclosed for configuring demodulation reference signal bundling and transport block scheduling. One method includes receiving a first configuration from a network. The first configuration includes: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof. The method includes receiving a second configuration from the network. The second configuration includes: a third indication to enable a single transport block (TB) scheduling across multiple transmission occasion for a physical chan-
(Continued)

nel; and a fourth indication of a number of transmission occasion over which a single transport block is transmitted, received, or a combination thereof.

20 Claims, 11 Drawing Sheets

(58) Field of Classification Search
CPC ....... H04L 5/0051; H04L 1/08; H04L 5/0044; H04L 5/0091; H04L 5/0094; H04L 5/0048
See application file for complete search history.

(56) References Cited

U.S. PATENT DOCUMENTS

| | | | |
|---|---|---|---|
| 2023/0047006 A1* | 2/2023 | You | H04L 5/0044 |
| 2025/0015947 A9* | 1/2025 | Hasegawa | H04W 52/281 |

OTHER PUBLICATIONS

3GPP, "3rd Generation Partnership Project; Technical Specification Group Radio Access Network; Study on NR coverage enhancements (Release 17)", 3GPP TR 38.830 V1.0.0, Dec. 2020, pp. 1-93.

3GPP, "3rd Generation Partnership Project; Technical Specification Group Radio Access Network; NR; Physical channels and modulation (Release 16)", 3GPP TS 38.211 V16.3.0, Sep. 2020, pp. 1-133.

3GPP, "3rd Generation Partnership Project; Technical Specification Group Radio Access Network; NR; Multiplexing and channel coding (Release 16)", 3GPP TS 38.212 V16.3.0, Sep. 2020, pp. 1-152.

3GPP, "3rd Generation Partnership Project; Technical Specification Group Radio Access Network; NR; Physical layer procedures for control (Release 16)", 3GPP TS 38.213 V16.3.0, Sep. 2020, pp. 1-179.

3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.

3GPP, "3rd Generation Partnership Project; Technical Specification Group Radio Access Network; NR; Medium Access Control (MAC) protocol specification (Release 16)", 3GPP TS 38.321 V16.2.0, Sep. 2020, pp. 1-154.

3GPP, "3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.

* cited by examiner

1100

Begin

1102 — Transmit A First Configuration, Wherein The First Configuration Comprises: A First Indication To Enable Demodulation Reference Signal (DM-RS) Bundling For A Physical Channel; A Second Indication Of A Duration For A Time-Domain Window (TDW) Length For DM-RS Bundling, Wherein The Duration Of The TDW Indicates A Number Of Symbols Across Which Joint Channel Estimation Is Performed; Or A Combination Thereof 1104 — Transmit A Second Configuration, Wherein The Second Configuration Comprises: A Third Indication To Enable A Single Transport Block (TB) Scheduling Across Multiple Transmission Occasion For A Physical Channel; And A Fourth Indication Of A Number Of Transmission Occasion Over Which A Single Transport Block Is Transmitted, Received, Or A Combination Thereof

End

FIG. 11

CONFIGURING DEMODULATION REFERENCE SIGNAL BUNDLING AND TRANSPORT BLOCK SCHEDULING

CROSS-REFERENCE TO RELATED APPLICATIONS

This application claims priority to U.S. Patent Application Ser. No. 63/137,898 entitled "APPARATUSES, METHODS, AND SYSTEMS FOR SIGNALING ASPECTS FOR DM-RS BUNDLING AND MULTI-SLOT TB ENHANCEMENTS FOR PUSCH/PUCCH COVERAGE" and filed on Jan. 15, 2021 for Ankit Bhamri, which is incorporated herein by reference in its entirety.

FIELD

The subject matter disclosed herein relates generally to wireless communications and more particularly relates to configuring demodulation reference signal bundling for joint channel estimation and single transport block scheduling across multiple transmission occasions.

BACKGROUND

In certain wireless communications networks, demodulation reference signals may be used for performing channel estimation. Moreover, transport blocks may be scheduled for transmission.

BRIEF SUMMARY

Methods for configuring demodulation reference signal bundling for joint channel estimation and single transport block scheduling across multiple transmission occasions are disclosed. Apparatuses and systems also perform the functions of the methods. One embodiment of a method includes receiving, at a user equipment, a first configuration from a network. The first configuration includes: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof. In some embodiments, the method includes receiving a second configuration from the network. The second configuration includes: a third indication to enable a single transport block (TB) scheduling across multiple transmission occasion for a physical channel; and a fourth indication of a number of transmission occasion over which a single transport block is transmitted, received, or a combination thereof.

One apparatus for configuring demodulation reference signal bundling and transport block scheduling includes a user equipment. In some embodiments, the apparatus includes a receiver that: receives a first configuration from a network, wherein the first configuration includes: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof; and receives a second configuration from the network. The second configuration includes: a third indication to enable a single transport block (TB) scheduling across multiple transmission occasion for a physical channel; and a fourth indication of a number of transmission occasion over which a single transport block is transmitted, received, or a combination thereof.

Another embodiment of a method for configuring demodulation reference signal bundling and transport block scheduling includes transmitting, from a network device, a first configuration. The first configuration includes: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof. In some embodiments, the method includes transmitting a second configuration. The second configuration includes: a third indication to enable a single transport block (TB) scheduling across multiple transmission occasion for a physical channel; and a fourth indication of a number of transmission occasion over which a single transport block is transmitted, received, or a combination thereof.

Another apparatus for configuring demodulation reference signal bundling and transport block scheduling includes a network device. In some embodiments, the apparatus includes a transmitter that: transmits a first configuration, wherein the first configuration includes: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof; and transmits a second configuration. The second configuration includes: a third indication to enable a single transport block (TB) scheduling across multiple transmission occasion for a physical channel; and a fourth indication of a number of transmission occasion over which a single transport block is transmitted, received, or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 11 is a flow chart diagram illustrating another embodiment of a method for configuring demodulation reference signal bundling and transport block scheduling.

DETAILED DESCRIPTION

Figure 1:
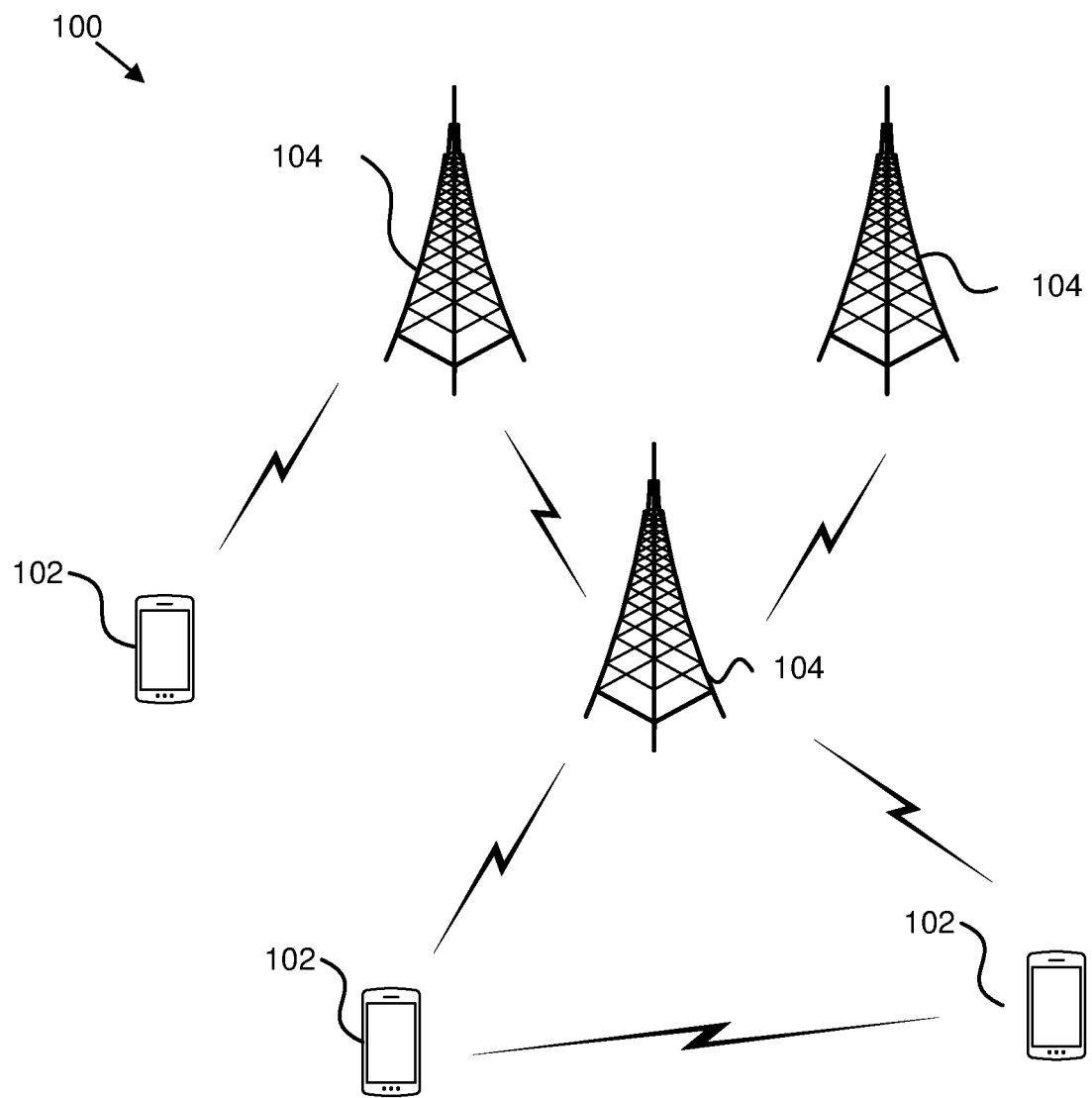
FIG. 1 is a schematic block diagram illustrating one embodiment of a wireless communication system for configuring demodulation reference signal bundling and transport block scheduling.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the FIGS. illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring demodulation reference signal bundling and transport block scheduling. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive a first configuration from a network. The first configuration includes: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof. In some embodiments, the remote unit 102 may receive a second configuration from the network. The second configuration includes: a third indication to enable a single transport block (TB) scheduling across multiple transmission occasion for a physical channel; and a fourth indication of a number of transmission occasion over which a single transport block is transmitted, received, or a combination thereof. Accordingly, the remote unit 102 may be used for configuring demodulation reference signal bundling and transport block scheduling.

In certain embodiments, a network unit 104 may transmit a first configuration. The first configuration includes: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof. In some embodiments, the network unit 104 may transmit a second configuration. The second configuration includes: a third indication to enable a single transport block (TB) scheduling across multiple transmission occasion for a physical channel; and a fourth indication of a number of transmission occasion over which a single transport block is transmitted, received, or a combination thereof. Accordingly, the network unit 104 may be used for configuring demodulation reference signal bundling and transport block scheduling.

Figure 2:
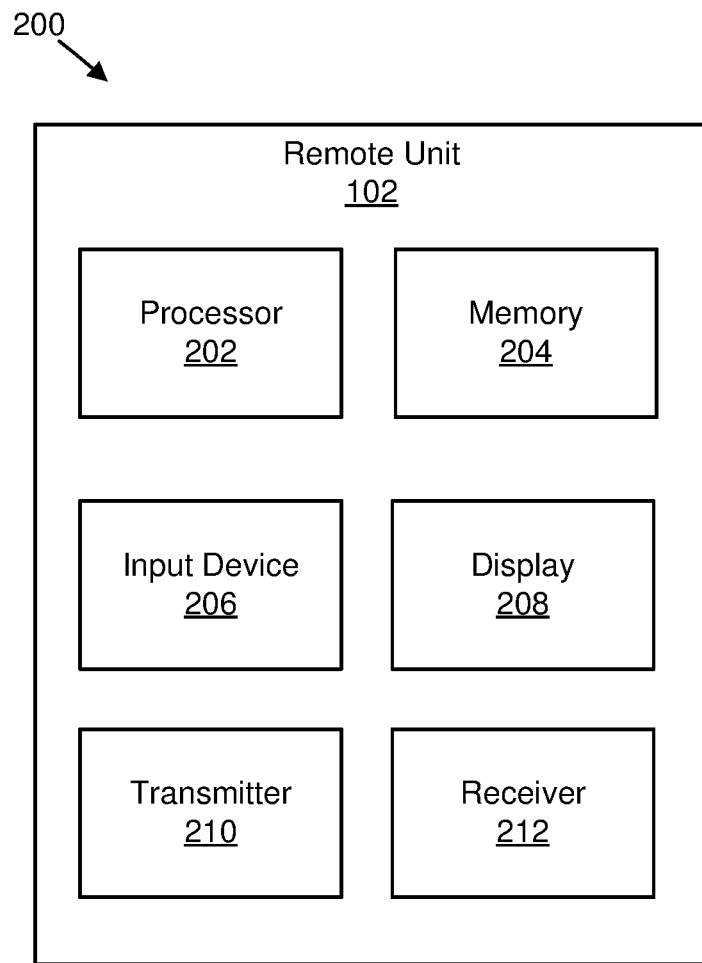
FIG. 2 is a schematic block diagram illustrating one embodiment of an apparatus that may be used for configuring demodulation reference signal bundling and transport block scheduling.

FIG. 2 depicts one embodiment of an apparatus 200 that may be used for configuring demodulation reference signal bundling and transport block scheduling. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212: receives a first configuration from a network, wherein the first configuration includes: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof; and receives a second configuration from the network. The second configuration includes: a third indication to enable a single transport block (TB) scheduling across multiple transmission occasion for a physical channel; and a fourth indication of a number of transmission occasion over which a single transport block is transmitted, received, or a combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
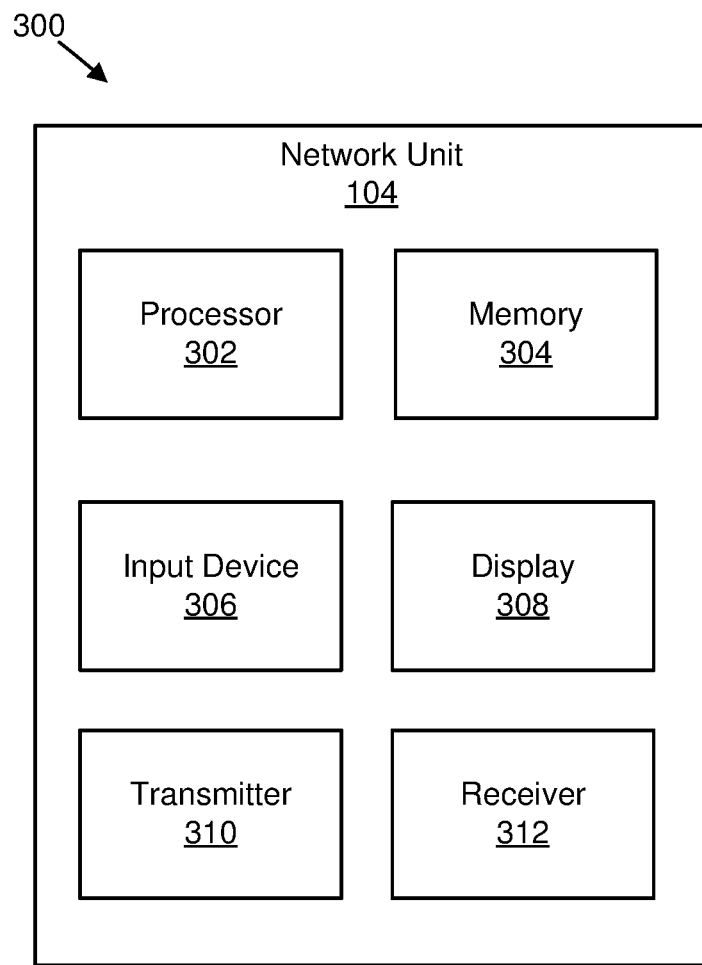
FIG. 3 is a schematic block diagram illustrating one embodiment of an apparatus that may be used for configuring demodulation reference signal bundling and transport block scheduling.

FIG. 3 depicts one embodiment of an apparatus 300 that may be used for configuring demodulation reference signal bundling and transport block scheduling. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits a first configuration, wherein the first configuration includes: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof; and transmits a second configuration. The second configuration includes: a third indication to enable a single transport block (TB) scheduling across multiple transmission occasion for a physical channel; and a fourth indication of a number of transmission occasion over which a single transport block is transmitted, received, or a combination thereof.

In certain embodiments: for joint channel estimation across multiple physical uplink shared channel ("PUSCH") and/or physical uplink control channel ("PUCCH") transmissions (e.g., including multiple slots), demodulation reference signal ("DM-RS") time-domain patterns may be used to indicate for different length of durations exceeding slots while trying to follow certain design principles such as maintaining phase continuity and power consistency within each of these durations. In such embodiments, joint channel estimation across multiple PUSCH and/or PUCCH may be handled along with frequency hopping.

In some embodiments, DM-RS time-domain patterns with additional DM-RS within a slot may be semi-statically configurable with a transmission to a user equipment ("UE"), where an actual number of additional DM-RS symbols depends on an actual PUSCH transmission length within a slot. The separation between a front-loaded DM-RS and additional DM-RS symbols within a slot may depend upon the number of additional DM-RS symbols. In various embodiments, there may be sufficient support for high mobility (e.g., by having more frequent DM-RS symbols in time), a number of time-domain patterns may be minimized (e.g., from UE complexity point of view), and extrapolation on many symbols in time may be avoided or enhanced by having a last DM-RS symbol as close as possible to a last symbol of a transmission (e.g., while trying to follow first two conditions as much as possible).

In certain embodiments, for single transport block ("TB") transmission across multiple PUSCH transmissions (e.g., including multiple slots), time domain resource allocation may be determined considering partial slot allocation (e.g., at least at a last PUSCH slot).

In some embodiments, single TB transmission across multiple slots or multiple transmission occasions is not used. In such embodiments, only multiple TB transmission or repetition of the same TB across multiple transmission occasions (e.g., including multiple slots) is supported. In various embodiments, a start and length indicator value ("SLIM") in a time domain resource allocation ("TDRA") table may be indicated and a number of repetitions may be indicated such that each repetition is transmitting a same TB across a same length of PUSCH (e.g., nominal length). In certain embodiments, multiple SLIVs may be indicated for multiple TB transmission.

In various embodiments, there may be DM-RS bundling across multiple transmissions and/or repetitions (e.g., such as multiple PUSCH or multiple PUCCH) and single TB transmission across multi-slot physical channel (e.g., such as multi-slot PUSCH).

In certain embodiments, there may be two sets of configurations for additional DM-RS symbols and a corresponding position for a physical channel within a transition time interval ("TTI") (e.g., such as a slot for PUSCH mapping type A), where a first set of additional DM-RS symbol configuration is applied on all the transmission occasions except for a last one and a second set of additional DM-RS symbol configuration is applied only on a last transmission occasion when multiple transmission occasions are scheduled (e.g., either for transmitting different TBs or repeating the same TB or one TB across multiple occasions or a combination of either of the possibilities).

In some embodiments, if a single TB is required to be scheduled across multiple transmission occasions (e.g., such as one uplink ("UL") TB to be scheduled across multiple PUSCHs) or a single TB is required to be scheduled across a single transmission occasion spanning multiple slots (e.g., such as one UL TB scheduled across multi-slot PUSCH), then to configure, indicate, and/or provide at least two durations for a transmission occasion (e.g., two values of "L" in a time-domains resource allocation table such as layer 1 ("L1") and layer 2 ("L2")) and a number of transmission occasions (e.g., either by TDRA table and/or separately), where a total length (e.g., duration) of the transmission is applied as: L1*number of transmission occasions+L2. In such embodiments, for two values of duration (L) for transmission occasions, the first value of the duration is applied to all transmission occasions except the last transmission occasion and the second value of the durations is applied only to the last transmission occasion.

In various embodiments, configuring two sets of additional DM-RS configurations may have equally spaced DM-RS for all transmission occasions in the middle (e.g., DM-RS position near the beginning and middle of the transmission occasion) for better interpolation of channel estimates and to enable a separate pattern for a last transmission occasion such that the DM-RS position is adjusted (e.g., last DM-RS position in the last transmission occasion in near the end of the transmission occasion) to enhance the extrapolation of channel estimates by placing last DM-RS symbol closer to the end of transmission while maintaining (e.g., close to) equal distance across DM-RS symbols.

In certain embodiments, configuring and/or indicating two durations for scheduling across multiple transmission occasions (e.g., including slots) may enable a partial slot duration on a last transmission occasion depending upon a resource requirement for achieving a target coverage while avoiding large signaling overhead for time-domain resource allocation. In some embodiments, there may be unlicensed and/or shared spectrum access where a last slot may need to be a partial slot to meet regulatory maximum channel occupancy time requirements.

In a first embodiment, additional DM-RS configuration enhancements may be made for DM-RS bundling. According to the first embodiment, two sets of additional DM-RS configurations are semi-statically (e.g., radio resource control ("RRC") signaling) configured to a UE, where the two sets of configurations may be either completely configured separately or only a sub-set is indicated as a second configuration that is different from the first configuration and where the first configuration set is applied to all transmission occasions except a last transmission occasion and the second configuration set is applied to only the last transmission occasion. The actual number of DM-RS symbols may be dynamically determined based on the time-domain resource allocation for each of the transmission occasion.

Figure 4:
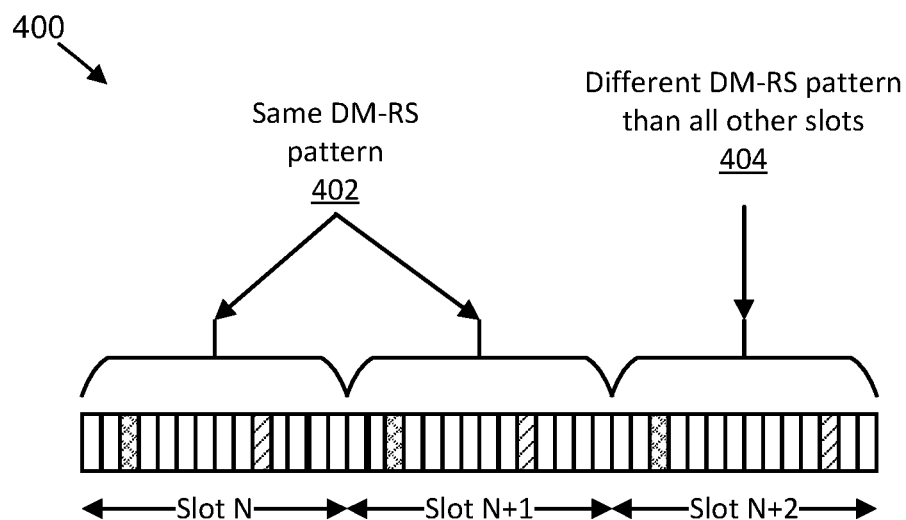
FIG. 4 is a schematic block diagram illustrating one embodiment of timing with two different DM-RS patterns between last and all the other slots.

FIG. 4 is a schematic block diagram illustrating one embodiment of timing 400 with two different DM-RS patterns between last and all the other slots. The timing 400 diagram shows slots with the same DM-RS pattern 402 and a slot with a different DM-RS pattern than all other slots 404. For example, as shown in FIG. 4, where PUSCH mapping type A with a length of 14 symbols and one additional symbol (e.g., dmrs-AdditionalPosition equal to 'pos1') is shown for three consecutive PUSCH transmission occasions (e.g., slots) over which DM-RS bundling is applied. As shown in FIG. 4, for the last slot (e.g., DM-RS pattern including the DM-RS position for the additional DM-RS), the position of the additional DM-RS is different than the position of additional DM-RS in all the previous slots. The position for the first DM-RS in all slots is fixed to a third symbol with PUSCH mapping type A with dmrs-TypeA-Position equal to 'pos2'.

In various examples, a 'last transmission occasion' may include a last transmission occasion of a contiguous burst of transmission occasions. Moreover, a PUSCH may include a first contiguous burst of transmission occasions and a second contiguous burst of transmission occasions where the last transmission occasion of the first contiguous burst of transmission occasions and the first transmission occasion of the second contiguous burst of transmission occasions are not consecutive.

In certain embodiments, similar to the illustration in FIG. 4, when the duration for each of the transmission occasions is of the same length and two set of configurations of additional DM-RS patterns are configured, then according to the first configuration set of additional DM-RS patterns, the same number of additional DM-RS symbols and same location for each of the additional DM-RS symbols is applied to all the transmission occasions except the last transmission occasion and according to the second configuration set of additional DM-RS patterns a different number of additional DM-RS symbols with different location is applied to the last transmission occasion (e.g., compared to the earlier transmission occasions).

Figure 5:
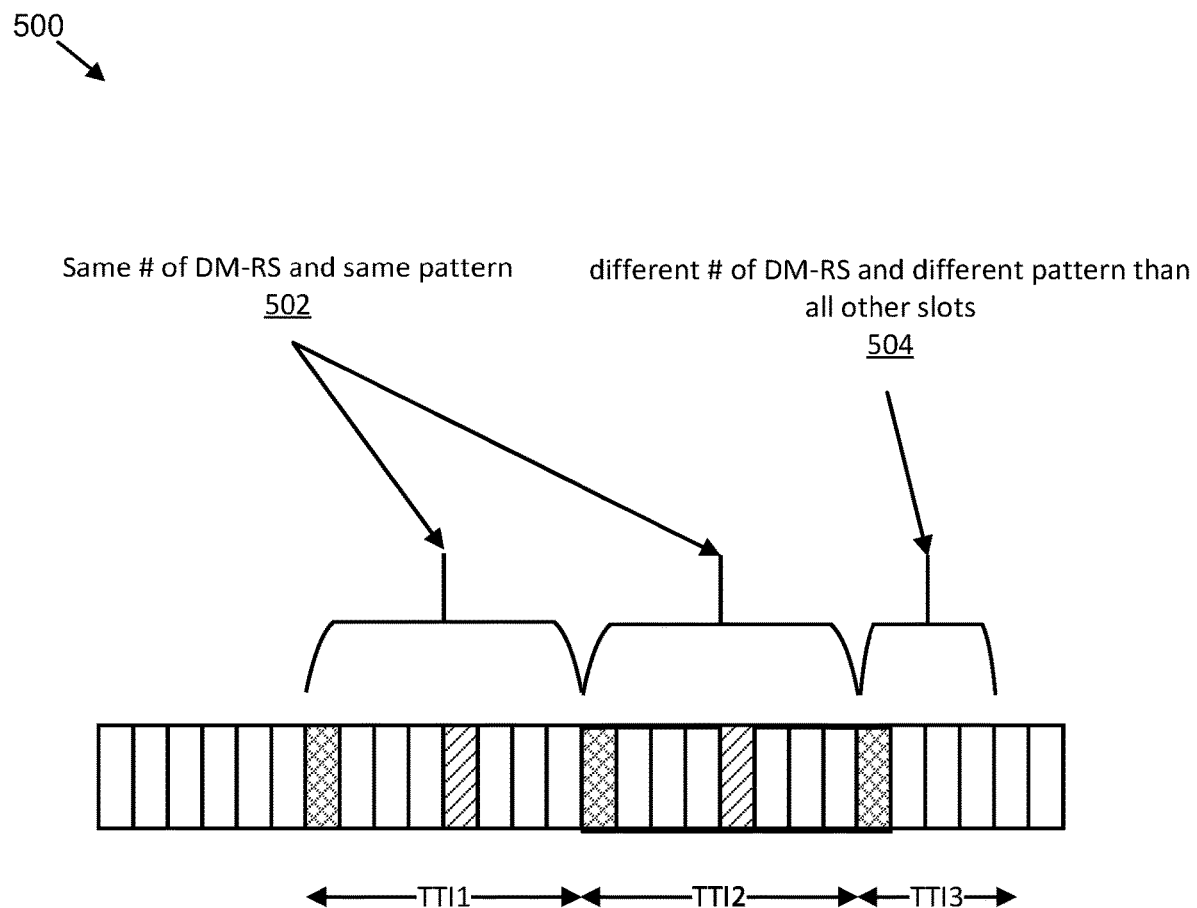
FIG. 5 is a schematic block diagram illustrating one embodiment of timing with a different number of DM-RS and different patterns between a last and all the other TTIs.

FIG. 5 is a schematic block diagram illustrating one embodiment of timing with a different number of DM-RS and different patterns between a last and all the other TTIs. The timing 500 diagram shows slots with the same number of DM-RS and the same pattern 502 and a slot with a different number of DM-RS and different pattern than all other slots 504. In FIG. 2, if a duration (e.g., $l_d$ in symbols) for each of the transmission occasions can be different and two set of configurations of additional DM-RS patterns are configured, then according to the first configuration set of additional DM-RS patterns, depending upon the duration of each of the transmission occasions, the number of additional DM-RS symbols and corresponding location can be different for any two transmission occasions among all the transmission occasions except the last transmission occasion. And, according to the second configuration set of additional DM-RS patterns a different number of additional DM-RS symbols with different location is applied to the last transmission occasion (e.g., compared to an earlier transmission occasion of the same duration). In FIG. 5, a maximum of 1 additional DM-RS symbol per transmission occasion is indicated, but only transmitted in those occasions with required duration for an additional DM-RS (e.g., for more than 4 symbols in TTI).

In some embodiments, a second configuration set of additional DM-RS patterns may have a different number of additional DM-RS symbols and/or different positions of additional DM-RS symbols compared to the first configuration set of additional DM-RS patterns for the same transmission occasion duration (e.g., $l_d$ in symbols).

In various embodiments, a UE is configured and/or indicated with DM-RS bundling duration in terms of slots or symbols, subframes, or frames (e.g., explicitly or implicitly based on time-domain resource allocation), where channel estimation is done based on the DM-RS symbols across multiple transmission occasions that may be contained within the DM-RS bundling duration. In such embodiments, the UE may be required to maintain (e.g., within tolerable limits) at least phase coherency and/or continuity within the DM-RS bundling duration. In one implementation, DM-RS bundling duration may be the same as the total duration of all the transmission occasions combined, similar to FIGS. 4 and 5 (e.g., channel estimation can be performed based on DM-RS symbols in all the transmission occasions).

Figure 6:
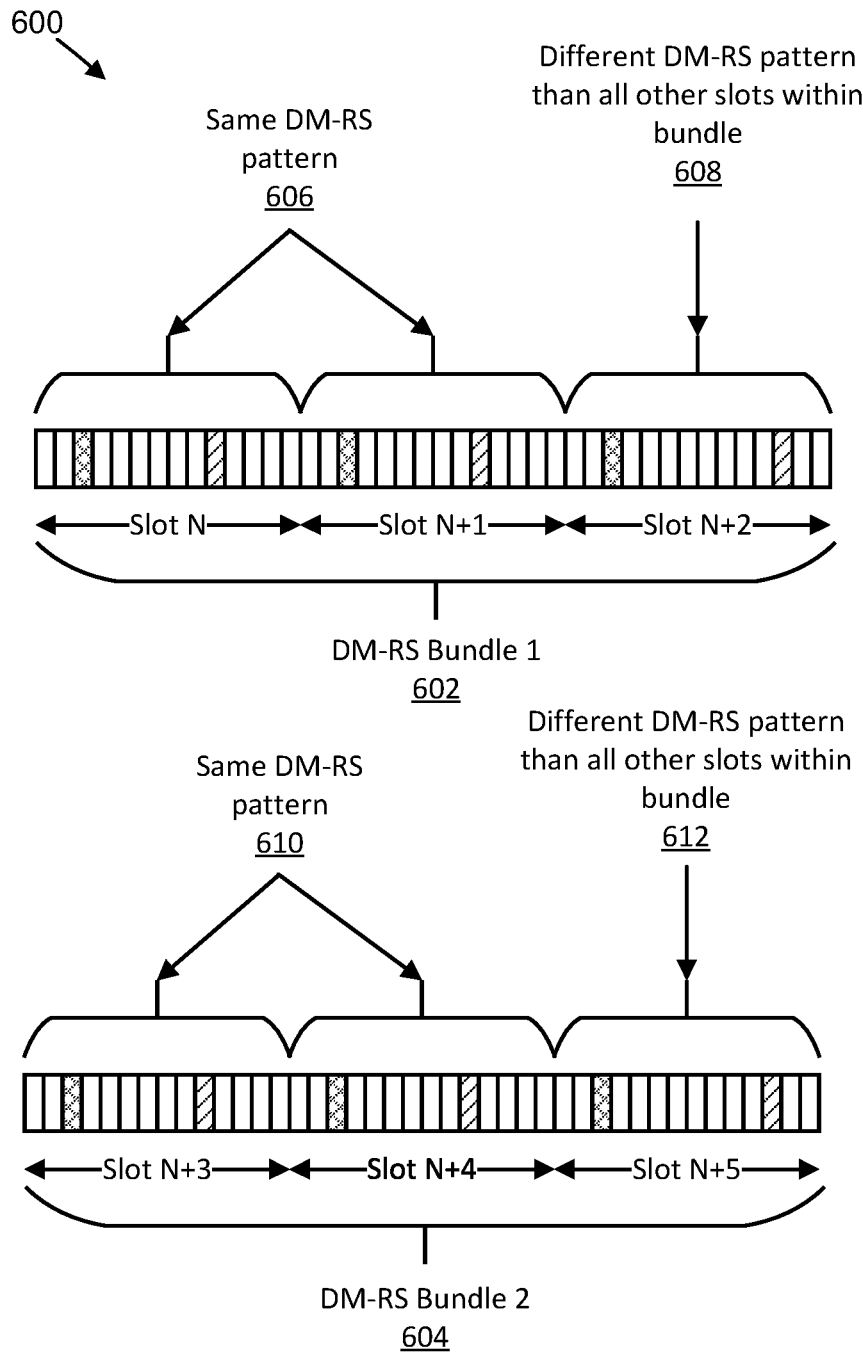
FIG. 6 is a schematic block diagram illustrating one embodiment of timing with multiple DM-RS bundles.

FIG. 6 is a schematic block diagram illustrating one embodiment of timing 600 with multiple DM-RS bundles. The timing 600 shows DM-RS bundle 1 602 and DM-RS bundle 2 604. The first DM-RS bundle 1 602 includes slots having a same DM-RS pattern 606 and a slot having a different DM-RS pattern than all other slots with the bundle 608. Moreover, the second DM-RS bundle 2 604 includes slots having a same DM-RS pattern 610 and a slot having a different DM-RS pattern than all other slots with the bundle 612. In FIG. 6, DM-RS bundling duration is a shorter duration than the total duration of all the scheduled transmission occasions. In such embodiments, if a UE is configured with two set of additional DM-RS configurations, then the first set of configurations is applied to all the transmission occasions except the last transmission occasion that are all contained within one DM-RS bundle and the second set of configurations is applied to the last transmission occasion contained within the DM-RS bundle. A similar procedure may be followed for the second DM-RS bundle as well.

In various embodiments, a DM-RS pattern of a first transmission occasion in a first DM-RS bundle may be different than the DM-RS pattern of the first transmission occasion in a second DM-RS bundle (e.g., based on a transmission occasion duration). Similarly, the DM-RS pattern of a last transmission occasion in the first DM-RS bundle may be different than the DM-RS pattern of a last transmission occasion in the second DM-RS bundle.

In certain embodiments, two DM-RS configurations are provided to a UE, where a first configuration is used for all UL transmission slots except a last one, and a second configuration is applied to a last UL slot. The first configuration indicates a front-loaded DM-RS on a first transmission occasion and additional positions for mapping additional DM-RS symbols are indicated in correspondence to the UL symbols over the multiple UL slots. For example, front-loaded DM-RS symbol is located on symbol index 0, while additional positions (e.g., signaled to the UE) are located with equidistance of 4 symbols in correspondence to the total symbols of all UL slots for a DM-RS bundle except the last one (e.g., on 4, 8, 12, 16, 20, etc.), where index 16 and 20 correspond to symbol index 2 and 6 respectively of the second slot.

In some embodiments, a DM-RS bundle is indicated as a bundling factor or number of DM-RS bundles. For example, if there are 4 transmission occasions scheduled and the DM-RS bundling factor is 2, then the DM-RS bundling duration is calculated as 2 transmission occasions.

In various embodiments, a DM-RS bundle duration or a DM-RS bunding factor is determined based on an actual contiguous transmission duration. In one example, 4 transmission occasions are scheduled, but based on time-domain resource allocation or configured and/or indicated slot format, contiguous availability of a required number of symbols is only limited to 2 transmission occasions, then the DM-RS bundle duration is limited to two transmissions occasions.

In certain embodiments, a DM-RS bundle duration across the different DM-RS bundles of the scheduled transmissions can be different.

Figure 7:
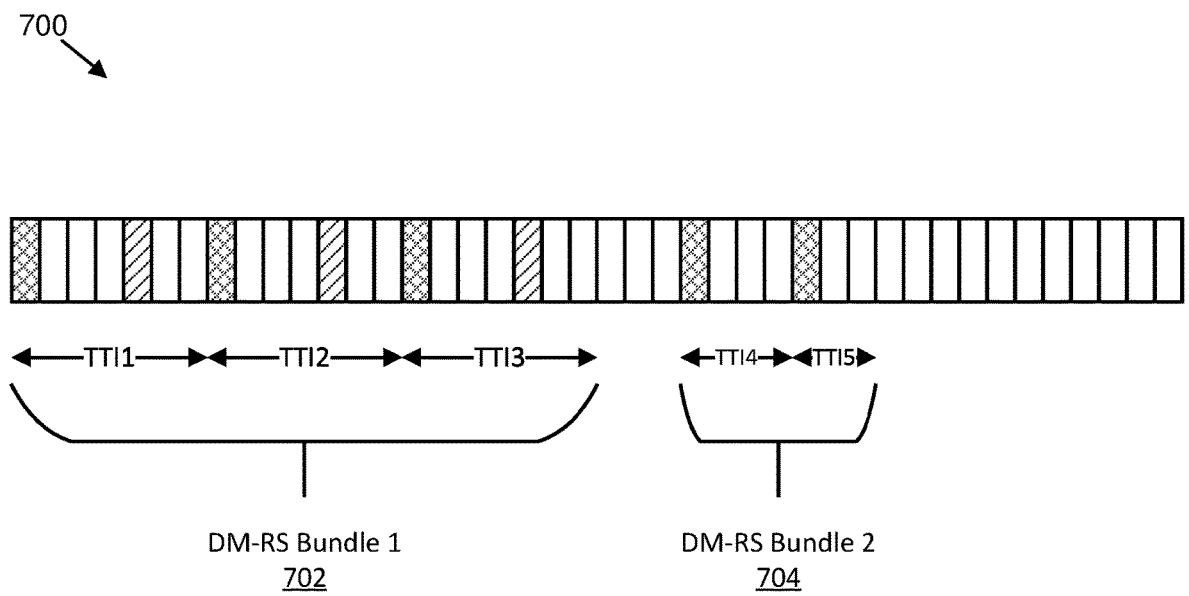
FIG. 7 is a schematic block diagram illustrating one embodiment of timing with multiple DM-RS bundles due to gaps.

FIG. 7 is a schematic block diagram illustrating one embodiment of timing 700 with multiple DM-RS bundles due to gaps. As illustrated, a gap is between a DM-RS bundle 1 702 and a DM-RS bundle 2 704. In FIG. 7, DM-RS bundling is applied to PUSCH repetition type B with 4 nominal repetitions with length of each nominal repetition being 7, but based on availability of UL symbols, there may be segmentation and a number of actual repetitions being 5 with a gap between the 3rd and 4th actual repetition. Based on this, there are two DM-RS bundles where the DM-RS bundle 1 702 duration being 21 symbols (e.g., 3 actual repetitions across two slots) and DM-RS bundle 2 704 duration is 7 symbols (e.g., 2 actual repetitions). Additional DM-RS per actual repetition is configured to be 2 (e.g., but transmitted only when the duration of TTI is longer than 4).

In some embodiments, a same DM-RS bundle may be applied only across contiguous transmissions with no gaps for other transmission or muted symbols if the power consistency and/or phase continuity is maintained (e.g., within tolerable limits). In various embodiments, DM-RS bundling cannot be applied across non-contiguous transmissions. In certain embodiments, non-contiguity may be considered between a boundary of two slots as well. In one implementation, non-contiguity may be considered (e.g., due to loss in phase continuity for some UE implementations) even if the there is no gap in transmission between two symbols (e.g., of the same or between different transmission occasions), but the frequency allocation across the two symbols is partially or completely different.

In some embodiments, if both frequency hopping and DM-RS bundling are configured and/or indicated to a UE, then a duration of frequency hop and duration for DM-RS bundling is same. In one instance, even if the duration of configured TDW for DM-RS bundling is greater than the duration of the frequency hop, still the actual duration of the TDW would be equal to the duration of frequency hop. Basically, the DM-RS bundle cannot span beyond the hop.

Figure 8:
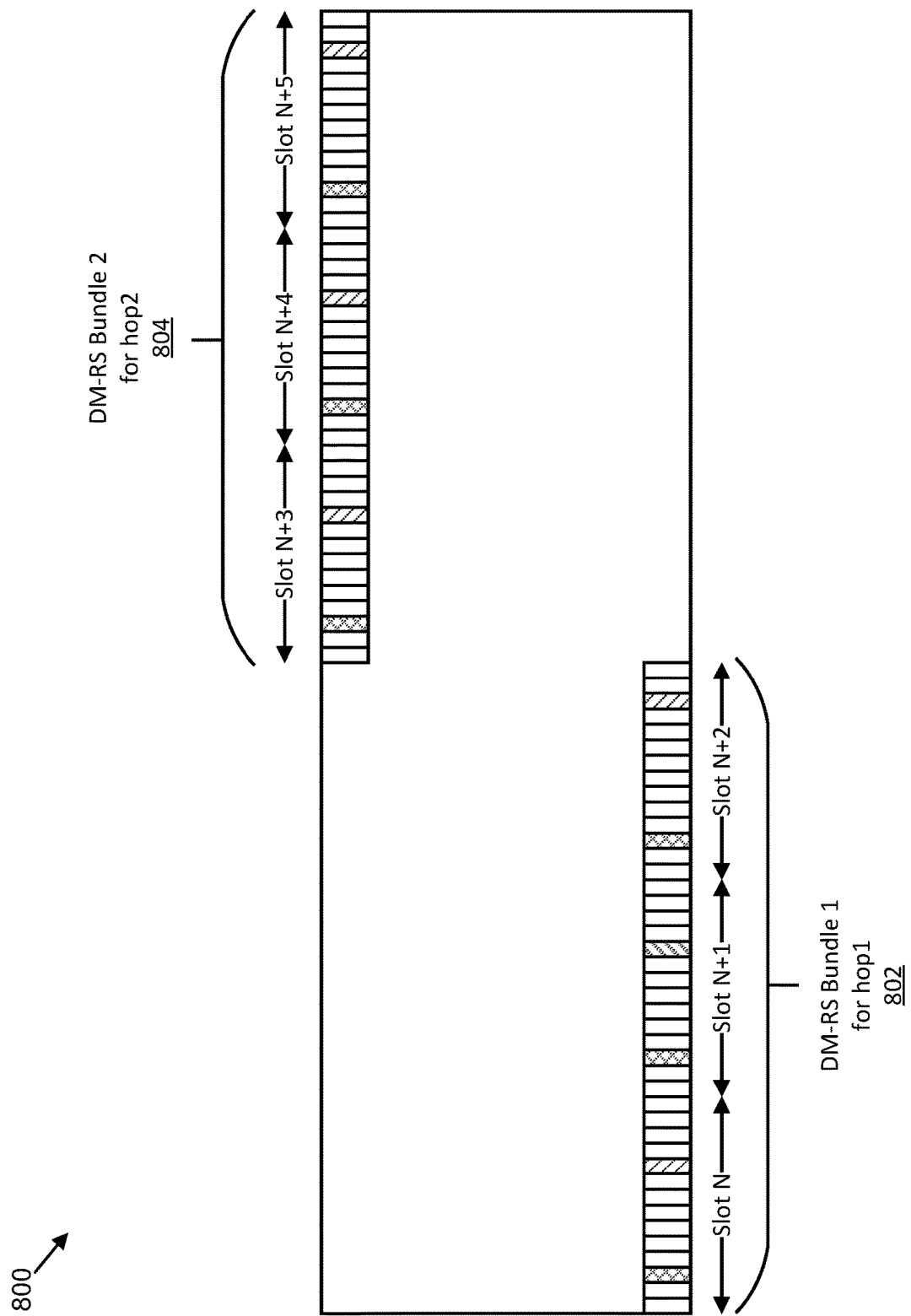
FIG. 8 is a schematic block diagram illustrating one embodiment of timing with multiple DM-RS bundles due to frequency hopping.

FIG. 8 is a schematic block diagram illustrating one embodiment of timing 800 with multiple DM-RS bundles due to frequency hopping. As illustrated, a frequency hop is between a DM-RS bundle 1 802 and a DM-RS bundle 2 804. In FIG. 8, 4 slots are scheduled, and DM-RS bundling duration is configured and/or indicated as 2 slots and frequency hopping is enabled, then a duration of each hop is also considered as 2 slots. Furthermore, a UE is configured with two sets of additional DM-RS configuration, the additional DM-RS pattern is applied according to a first configuration on a 1st slot of each of the hops and an additional DM-RS pattern is applied according to a second configuration on a 2nd slot of each of the hops. The same principle as described in other embodiments herein may be applied with two sets of additional DM-RS configuration where a first configuration is applied to all transmission occasions within a DM-RS bundle (e.g., 1st slot of each hop) except a last transmission occasion and a second configuration is applied to only a last transmission occasion within a DM-RS bundle (e.g., 2nd slot of each hop).

In various embodiments, a UE is configured with two sets of additional DM-RS configurations for PUSCH DM-RS positions within a slot for single-symbol DM-RS and intraslot and with frequency hopping disabled, where the first configuration is provided and the second configuration is given by Table 1 (e.g., only for $l_0=2$—similar table could be used for $l_0=3$ or a new one can be configured). The first configuration is applied to only the last transmission occasion (or last actual repetition for PUSCH repetition type B) (e.g., which is better with lesser extrapolation) and the second configuration is applied to all the transmission occasions (or actual repetitions) except the last one (e.g., which is better for interpolation across transmission occasions). Similar tables with adjusted positions for some or all of the entries may be configured for different PUSCH and/or physical downlink shared channel ("PDSCH") with different settings. It should be noted that the first and second set configurations applicability order may be interchanged relative to the configurations in other embodiments.

TABLE 1

Example of second configuration for PUSCH DM-RS positions within a slot for single-symbol DM-RS and intra-slot frequency hopping disabled

| $l_d$ in symbols | DM-RS positions $\bar{l}$ | | | | | | | |
|---|---|---|---|---|---|---|---|---|
| | PUSCH mapping type A (for $l_0$ = 2) dmrs-AdditionalPosition | | | | PUSCH mapping type B dmrs-AdditionalPosition | | | |
| | pos0 | pos1 | pos2 | pos3 | pos0 | pos1 | pos2 | pos3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 3 | $l_0$, 3 | $l_0$, 3 |
| 6 | $l_0$ | $l_0$ | $l_0$ | $l_0$ | $l_0$ | $l_0$, 3 | $l_0$, 3 | $l_0$, 3 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 6 | $l_0$, 6 | $l_0$, 6 | $l_0$ | $l_0$, 4 | $l_0$, 3, 6 | $l_0$, 3, 6 |
| 9 | $l_0$ | $l_0$, 6 | $l_0$, 6 | $l_0$, 6 | $l_0$ | $l_0$, 5 | $l_0$, 3, 6 | $l_0$, 3, 6 |
| 10 | $l_0$ | $l_0$, 7 | $l_0$, 5, 8 | $l_0$, 5, 8 | $l_0$ | $l_0$, 5 | $l_0$, 4, 7 | $l_0$, 3, 6, 8 |
| 11 | $l_0$ | $l_0$, 7 | $l_0$, 6, 10 | $l_0$, 6, 10 | $l_0$ | $l_0$, 5 | $l_0$, 4, 8 | $l_0$, 3, 6, 9 |
| 12 | $l_0$ | $l_0$, 8 | $l_0$, 6, 10 | $l_0$, 5, 8, 11 | $l_0$ | $l_0$, 6 | $l_0$, 4, 8 | $l_0$, 3, 6, 9 |
| 13 | $l_0$ | $l_0$, 8 | $l_0$, 6, 10 | $l_0$, 5, 8, 11 | $l_0$ | $l_0$, 6 | $l_0$, 4, 8 | $l_0$, 3, 6, 9 |
| 14 | $l_0$ | $l_0$, 9 | $l_0$, 7, 12 | $l_0$, 5, 8, 12 | $l_0$ | $l_0$, 7 | $l_0$, 5, 10 | $l_0$, 3, 6, 10 |

In certain embodiments, a UE is explicitly configured with one set of additional DM-RS configuration and the second set of additional DM-RS configuration (e.g., second configuration in Table 1) may be determined based on some symbol offset for shifting DM-RS symbols in comparison to the symbols' positions for the first configuration.

In some embodiments, if a UE is configured with a second configuration for additional DM-RS patterns for a given mapping type and DM-RS type and hopping configuration (e.g., in additional to a first configuration which is normally configured to the UE), then the UE is expected to perform DM-RS bundling. In various embodiments, a UE is configured and/or indicated with explicit signaling to apply DM-RS bundling. In certain embodiments, it is up to the implementation if DM-RS bundling is applied. In such embodiments, the UE may be required to maintain power consistency and/or phase continuity for at least a portion of the DM-RS symbols. In some embodiments, there is a relation between a coverage performance requirement. If the performance requirement is above a certain threshold, then the UE is expected to apply DM-RS bundling.

In a second embodiment, there may be time-domain resource allocation enhancements for TB transmission across multiple transmission occasions. According to the second embodiment, if a UE is configured and/or indicated to transmit or receive a single TB across multiple transmission occasions, then the UE is indicated with at least two separate durations such as two separate values of L in the TDRA table, where the first duration is applied to all the transmission occasions except the last transmission occasions (or last actual repetition for PUSCH repetition type B) and the second duration is applied to only the last transmission occasion.

In various embodiments, if a UE is configured and/or indicated to transmit or receive a single TB across multiple transmission occasions with PUSCH mapping type A and if the UE is indicated with only one duration which is less than 14 symbols, such as indicated by L in the TDRA table and additionally configured and/or indicated with an aggregation factor to indicate the number of slots for transmission (e.g., either semi-statically or dynamically by TDRA), then all the slots except the last slot are expected to be transmitted on all the 14 symbols (e.g., if available) and the duration of the last slot used for transmission is equal to the duration configured and/or indicated to the UE. In one example implementation, a UE is configured with PUSCH grant with mapping type A, where 3 slots are scheduled for transmitting a single TB and the indicated L=4 by TDRA table, then the TDRA for such scheduling is illustrated in FIG. 9.

Figure 9:
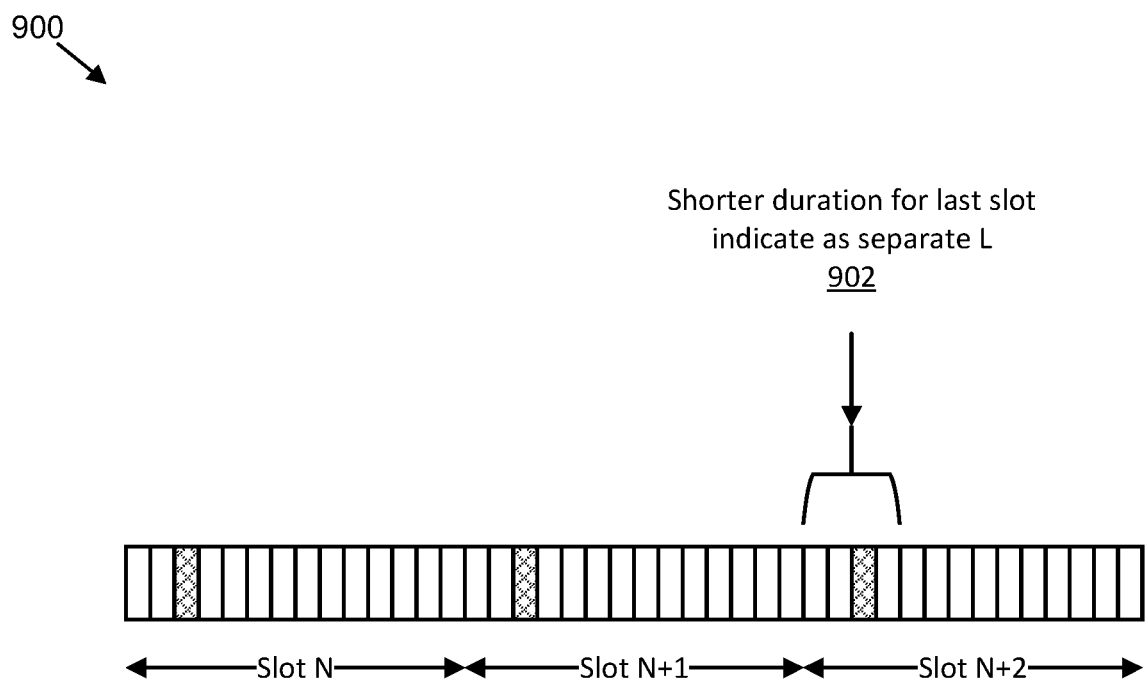
FIG. 9 is a schematic block diagram illustrating one embodiment of timing with a TDRA for partial slot at an end.

FIG. 9 is a schematic block diagram illustrating one embodiment of timing 900 with a TDRA for partial slot at an end. The timing 900 includes a shorter duration for a last slot to indicate as separate L 902.

In certain embodiments, if a UE is configured and/or indicated to transmit or receive a single TB across multiple transmission occasions with PUSCH mapping type B, then the UE is indicated with at least two separate durations such as two separate values of L in the TDRA table and additionally configured, indicated, and/or provided with single value k2 (e.g., slot offset), S (e.g., starting symbol within a slot), and aggregation factor (e.g., to indicate number of PUSCH transmission occasion over which entire TB is transmitted). In one example implementation, a UE is configured with PUSCH grant with mapping type B, S=6, L={8,4}, aggregation factor=3, then the TDRA for such scheduling is illustrated in FIG. 5.

In some embodiments, if a UE is configured and/or indicated to transmit or receiver a single TB across multiple transmission occasions and also is configured and/or indicated to repeat the TB, then the UE may be indicated with two aggregation and/or repetition factor, where one factor is used to determine the total number of transmission occasions over which single TB is transmitted and the second factor is used to determine the number of repetitions for that TB. In this scenario, one repetition duration is determined by the total duration of all the transmission occasions for transmitting one instance of TB and the total duration for repeating multiple instances of TB is determined by multiplying the two indicated and/or configured aggregation and/or repetition factor. In various embodiments, if a UE is configured and/or indicated to either transmit a single TB across multiple transmission occasions or repeat a TB (e.g., one repetition version ("RV") instance of TB spanning one transmission occasion) across multiple transmission occasions, then only single aggregation and/or repetition factor can be indicated and/or configured for determining the number of transmission occasions.

In certain embodiments, a UE is semi-statically configured to transmit and/or receiver single TB transmission spanning multiple transmission occasions. In various embodiments, a UE is dynamically indicated with a single TB transmission by TDRA table. In one implementation, the TDRA table indicates a factor to determine the number of transmission occasions over which a single TB is transmitted. If the indicated value for this factor is 1 or if the factor is not indicated at all in the TDRA table, then it basically implies single TB transmission across multiple transmission occasions is not enabled.

In certain embodiments, if frequency hopping is enabled for PUSCH and/or PUCCH transmission, a UE is configured with time-domain resources for a single hop and additionally configured and/or indicated with a number of frequency hops. Then the total duration of the transmission is calculated by number of hops*length of each hop.

In some embodiments, a UE is configured with single TB transmission across multiple transmission occasions (e.g., including multiple slots) and also configured and/or indicated with DM-RS bundling. In various embodiments, a UE is configured and/or indicated with two values of L (e.g., duration for last transmission occasion and duration of all other transmission occasions) and also configured with two sets of additional DM-RS configurations, then the first DM-RS configuration is associated with all the transmission occasions with first duration value from L and the second DM-RS configuration is associated with all the transmission occasions with second duration value from L.

Figure 10:
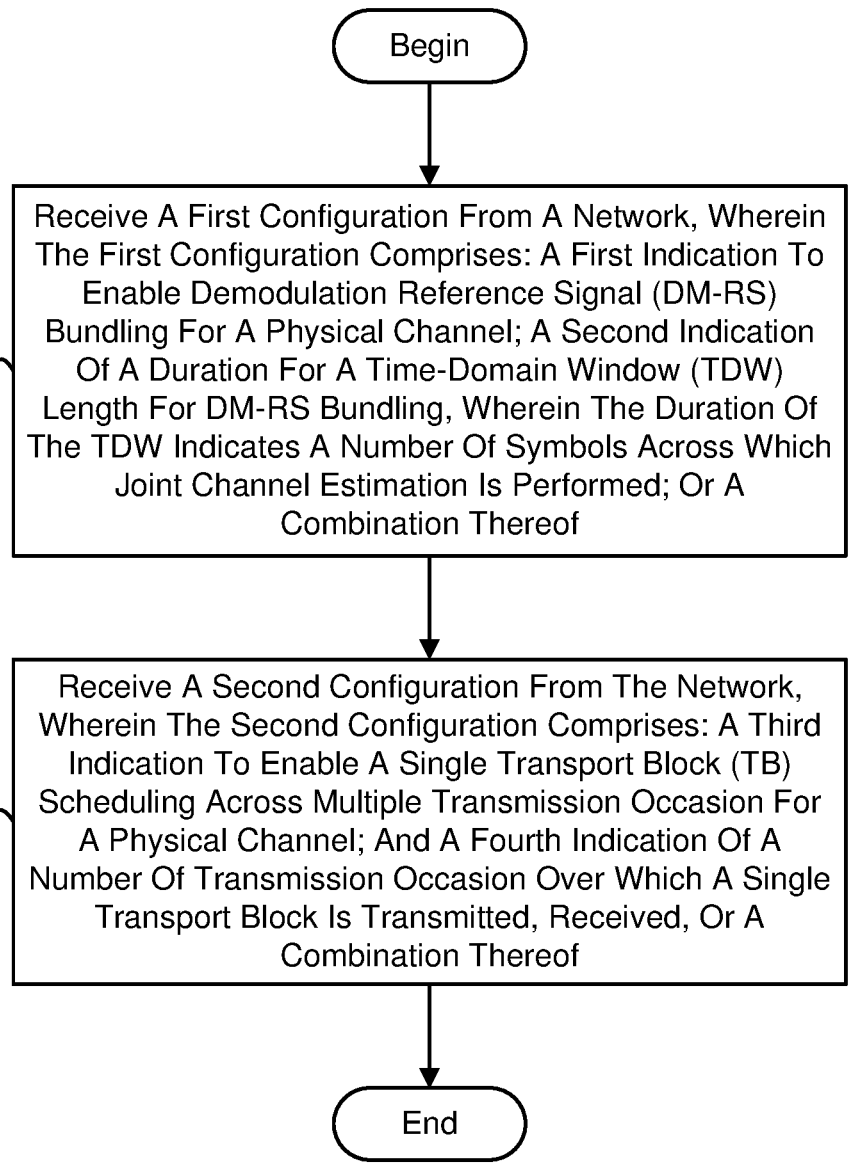
FIG. 10 is a flow chart diagram illustrating one embodiment of a method for configuring demodulation reference signal bundling and transport block scheduling.

FIG. 10 is a flow chart diagram illustrating one embodiment of a method 600 for configuring demodulation reference signal bundling and transport block scheduling. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002 a first configuration from a network. The first configuration includes: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof. In some embodiments, the method 1000 includes receiving 1004 a second configuration from the network. The second configuration includes: a third indication to enable a single transport block (TB) scheduling across multiple transmission occasion for a physical channel; and a fourth indication of a number of transmission occasion over which a single transport block is transmitted, received, or a combination thereof.

In certain embodiments, the physical channel is a physical uplink shared channel (PUSCH). In some embodiments, the physical channel is a physical uplink control channel (PUCCH). In various embodiments, if the TDW duration is not configured, then the TDW duration is implicitly determined.

In one embodiment, the TDW duration is determined based on a number of contiguous time-domain symbols across multiple transmission occasions. In certain embodiments, if frequency hopping is enabled, then the TDW duration is not greater than the frequency hopping duration. In some embodiments, the DM-RS bundle duration comprises at least two durations for a multiple number of transmission occasions.

In various embodiments, a first duration of the at least two durations is applied to all the transmission occasions except a last transmission occasion, and a second duration of the at least two durations is applied to only the last transmission occasion. In one embodiment, one transmission occasion corresponds to one slot duration. In certain embodiments, the number of transmission occasions across which the single TB is transmitted is indicated by a time-domain resource allocation (TDRA) table.

In some embodiments, the third indication to enable the single TB transmission across multiple transmission occasions is determined by a TDRA table, and if the number of transmission occasions across which the single TB is transmitted is not configured in the TDRA table or if the number of number of transmission occasions across which the single TB is transmitted is configured and the number is equal to one, then the single TB transmission across multiple transmission occasions is not enabled.

FIG. 11 is a flow chart diagram illustrating another embodiment of a method 1100 for configuring demodulation reference signal bundling and transport block scheduling. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes transmitting 1102 a first configuration. The first configuration includes: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof. In some embodiments, the method 1100 includes transmitting 1104 a second configuration. The second configuration includes: a third indication to enable a single transport block (TB) scheduling across multiple transmission occasion for a physical channel; and a fourth indication of a number of transmission occasion over which a single transport block is transmitted, received, or a combination thereof.

In certain embodiments, the physical channel is a physical uplink shared channel (PUSCH). In some embodiments, the physical channel is a physical uplink control channel (PUCCH). In various embodiments, if the TDW duration is not configured, then the TDW duration is implicitly determined.

In one embodiment, the TDW duration is determined based on a number of contiguous time-domain symbols across multiple transmission occasions. In certain embodiments, if frequency hopping is enabled, then the TDW duration is not greater than the frequency hopping duration. In some embodiments, the DM-RS bundle duration comprises at least two durations for a multiple number of transmission occasions.

In various embodiments, a first duration of the at least two durations is applied to all the transmission occasions except a last transmission occasion, and a second duration of the at least two durations is applied to only the last transmission occasion. In one embodiment, one transmission occasion corresponds to one slot duration. In certain embodiments, the number of transmission occasions across which the single TB is transmitted is indicated by a time-domain resource allocation (TDRA) table.

In some embodiments, the third indication to enable the single TB transmission across multiple transmission occasions is determined by a TDRA table, and if the number of transmission occasions across which the single TB is transmitted is not configured in the TDRA table or if the number of number of transmission occasions across which the single TB is transmitted is configured and the number is equal to one, then the single TB transmission across multiple transmission occasions is not enabled.

In one embodiment, a method of a user equipment (UE) comprises: receiving a first configuration from a network, wherein the first configuration comprises: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof; and receiving a second configuration from the network, wherein the second configuration comprises: a third indication to enable a single transport block (TB) scheduling across multiple transmission occasion for a physical channel; and a fourth indication of a number of transmission occasion over which a single transport block is transmitted, received, or a combination thereof.

In certain embodiments, the physical channel is a physical uplink shared channel (PUSCH).

In some embodiments, the physical channel is a physical uplink control channel (PUCCH).

In various embodiments, if the TDW duration is not configured, then the TDW duration is implicitly determined.

In one embodiment, the TDW duration is determined based on a number of contiguous time-domain symbols across multiple transmission occasions.

In certain embodiments, if frequency hopping is enabled, then the TDW duration is not greater than the frequency hopping duration.

In some embodiments, the DM-RS bundle duration comprises at least two durations for a multiple number of transmission occasions.

In various embodiments, a first duration of the at least two durations is applied to all the transmission occasions except a last transmission occasion, and a second duration of the at least two durations is applied to only the last transmission occasion.

In one embodiment, one transmission occasion corresponds to one slot duration.

In certain embodiments, the number of transmission occasions across which the single TB is transmitted is indicated by a time-domain resource allocation (TDRA) table.

In some embodiments, the third indication to enable the single TB transmission across multiple transmission occasions is determined by a TDRA table, and if the number of transmission occasions across which the single TB is transmitted is not configured in the TDRA table or if the number of number of transmission occasions across which the single TB is transmitted is configured and the number is equal to one, then the single TB transmission across multiple transmission occasions is not enabled.

In one embodiment, an apparatus comprises a user equipment (UE). The apparatus further comprises: a receiver that: receives a first configuration from a network, wherein the first configuration comprises: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof; and receives a second configuration from the network, wherein the second configuration comprises: a third indication to enable a single transport block (TB) scheduling across multiple transmission occasion for a physical channel; and a fourth indication of a number of transmission occasion over which a single transport block is transmitted, received, or a combination thereof.

In certain embodiments, the physical channel is a physical uplink shared channel (PUSCH).

In some embodiments, the physical channel is a physical uplink control channel (PUCCH).

In various embodiments, if the TDW duration is not configured, then the TDW duration is implicitly determined.

In one embodiment, the TDW duration is determined based on a number of contiguous time-domain symbols across multiple transmission occasions.

In certain embodiments, if frequency hopping is enabled, then the TDW duration is not greater than the frequency hopping duration.

In some embodiments, the DM-RS bundle duration comprises at least two durations for a multiple number of transmission occasions.

In various embodiments, a first duration of the at least two durations is applied to all the transmission occasions except a last transmission occasion, and a second duration of the at least two durations is applied to only the last transmission occasion.

In one embodiment, one transmission occasion corresponds to one slot duration.

In certain embodiments, the number of transmission occasions across which the single TB is transmitted is indicated by a time-domain resource allocation (TDRA) table.

In some embodiments, the third indication to enable the single TB transmission across multiple transmission occasions is determined by a TDRA table, and if the number of transmission occasions across which the single TB is transmitted is not configured in the TDRA table or if the number of number of transmission occasions across which the single TB is transmitted is configured and the number is equal to one, then the single TB transmission across multiple transmission occasions is not enabled.

In one embodiment, a method of a network device comprises: transmitting a first configuration, wherein the first configuration comprises: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof; and transmitting a second configuration, wherein the second configuration comprises: a third indication to enable a single transport block (TB) scheduling across multiple transmission occasion for a physical channel; and a fourth indication of a number of transmission occasion over which a single transport block is transmitted, received, or a combination thereof.

In certain embodiments, the physical channel is a physical uplink shared channel (PUSCH).

In some embodiments, the physical channel is a physical uplink control channel (PUCCH).

In various embodiments, if the TDW duration is not configured, then the TDW duration is implicitly determined.

In one embodiment, the TDW duration is determined based on a number of contiguous time-domain symbols across multiple transmission occasions.

In certain embodiments, if frequency hopping is enabled, then the TDW duration is not greater than the frequency hopping duration.

In some embodiments, the DM-RS bundle duration comprises at least two durations for a multiple number of transmission occasions.

In various embodiments, a first duration of the at least two durations is applied to all the transmission occasions except a last transmission occasion, and a second duration of the at least two durations is applied to only the last transmission occasion.

In one embodiment, one transmission occasion corresponds to one slot duration.

In certain embodiments, the number of transmission occasions across which the single TB is transmitted is indicated by a time-domain resource allocation (TDRA) table.

In some embodiments, the third indication to enable the single TB transmission across multiple transmission occasions is determined by a TDRA table, and if the number of transmission occasions across which the single TB is transmitted is not configured in the TDRA table or if the number of number of transmission occasions across which the single TB is transmitted is configured and the number is equal to one, then the single TB transmission across multiple transmission occasions is not enabled.

In one embodiment, an apparatus comprises a network device. The apparatus further comprises: a transmitter that: transmits a first configuration, wherein the first configuration comprises: a first indication to enable demodulation reference signal (DM-RS) bundling for a physical channel; a second indication of a duration for a time-domain window (TDW) length for DM-RS bundling, wherein the duration of the TDW indicates a number of symbols across which joint channel estimation is performed; or a combination thereof; and transmits a second configuration, wherein the second configuration comprises: a third indication to enable a single transport block (TB) scheduling across multiple transmission occasion for a physical channel; and a fourth indication of a number of transmission occasion over which a single transport block is transmitted, received, or a combination thereof.

In certain embodiments, the physical channel is a physical uplink shared channel (PUCCH).

In some embodiments, the physical channel is a physical uplink control channel (PUCCH).

In various embodiments, if the TDW duration is not configured, then the TDW duration is implicitly determined.

In one embodiment, the TDW duration is determined based on a number of contiguous time-domain symbols across multiple transmission occasions.

In certain embodiments, if frequency hopping is enabled, then the TDW duration is not greater than the frequency hopping duration.

In some embodiments, the DM-RS bundle duration comprises at least two durations for a multiple number of transmission occasions.

In various embodiments, a first duration of the at least two durations is applied to all the transmission occasions except a last transmission occasion, and a second duration of the at least two durations is applied to only the last transmission occasion.

In one embodiment, one transmission occasion corresponds to one slot duration.

In certain embodiments, the number of transmission occasions across which the single TB is transmitted is indicated by a time-domain resource allocation (TDRA) table.

In some embodiments, the third indication to enable the single TB transmission across multiple transmission occasions is determined by a TDRA table, and if the number of transmission occasions across which the single TB is transmitted is not configured in the TDRA table or if the number of number of transmission occasions across which the single TB is transmitted is configured and the number is equal to one, then the single TB transmission across multiple transmission occasions is not enabled.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
receiving a first configuration from a network, wherein the first configuration comprises:
a first indication to enable demodulation reference signal (DM-RS) bundling for a physical channel;
a second indication of a duration for a time-domain window (TDW) length for DM-RS bundling, wherein the duration of the TDW indicates a number of symbols across which joint channel estimation is performed;
or a combination thereof; and
receiving a second configuration from the network, wherein the second configuration comprises:
a third indication to enable a single transport block (TB) scheduling across multiple transmission occasion for a physical channel; and
a fourth indication of a number of transmission occasion over which a single transport block is transmitted, received, or a combination thereof.

2. A user equipment (UE), comprising:
at least one memory; and
at least one processor coupled with the at least one memory and configured to cause the UE to:
receive a first configuration from a network, wherein the first configuration comprises:
a first indication to enable demodulation reference signal (DM-RS) bundling for a physical channel;
a second indication of a duration for a time-domain window (TDW) length for DM-RS bundling, wherein the duration of the TDW indicates a number of symbols across which joint channel estimation is performed;
or a combination thereof; and
receive a second configuration from the network, wherein the second configuration comprises:
a third indication to enable a single transport block (TB) scheduling across multiple transmission occasion for a physical channel; and
a fourth indication of a number of transmission occasion over which a single transport block is transmitted, received, or a combination thereof.

3. The UE of claim 2, wherein the physical channel is a physical uplink shared channel (PUSCH).

4. The UE of claim 2, wherein the physical channel is a physical uplink control channel (PUCCH).

5. The UE of claim 2, wherein, if the TDW duration is not configured, then the TDW duration is implicitly determined.

6. The UE of claim 5, wherein the TDW duration is determined based on a number of contiguous time-domain symbols across multiple transmission occasions.

7. The UE of claim 2, wherein, if frequency hopping is enabled, then the TDW duration is not greater than the frequency hopping duration.

8. The UE of claim 2, wherein the DM-RS bundle duration comprises at least two durations for a multiple number of transmission occasions.

9. The UE of claim 8, wherein a first duration of the at least two durations is applied to all the transmission occasions except a last transmission occasion, and a second duration of the at least two durations is applied to only the last transmission occasion.

10. The UE of claim 2, wherein one transmission occasion corresponds to one slot duration.

11. The UE of claim 2, wherein the number of transmission occasions across which the single TB is transmitted is indicated by a time-domain resource allocation (TDRA) table.

12. The UE of claim 2, wherein the third indication to enable the single TB transmission across multiple transmission occasions is determined by a time-domain resource allocation (TDRA) table, and if the number of transmission occasions across which the single TB is transmitted is not configured in the TDRA table or if the number of number of transmission occasions across which the single TB is transmitted is configured and the number is equal to one, then the single TB transmission across multiple transmission occasions is not enabled.

13. A base station, comprising:
at least one memory; and
at least one processor coupled with the at least one memory and configured to cause the base station to:
transmit a first configuration, wherein the first configuration comprises:
a first indication to enable demodulation reference signal (DM-RS) bundling for a physical channel;
a second indication of a duration for a time-domain window (TDW) length for DM-RS bundling, wherein the duration of the TDW indicates a number of symbols across which joint channel estimation is performed;
or a combination thereof; and
transmit a second configuration, wherein the second configuration comprises:
a third indication to enable a single transport block (TB) scheduling across multiple transmission occasion for a physical channel; and
a fourth indication of a number of transmission occasion over which a single transport block is transmitted, received, or a combination thereof.

14. The base station of claim 13, wherein the physical channel is a physical uplink shared channel (PUSCH).

15. The base station of claim 13, wherein the physical channel is a physical uplink control channel (PUCCH).

16. A processor for wireless communication, comprising:
at least one controller coupled with at least one memory and configured to cause the processor to:
receive a first configuration from a network, wherein the first configuration comprises:
a first indication to enable demodulation reference signal (DM-RS) bundling for a physical channel;
a second indication of a duration for a time-domain window (TDW) length for DM-RS bundling, wherein the duration of the TDW indicates a number of symbols across which joint channel estimation is performed;
or a combination thereof; and
receive a second configuration from the network, wherein the second configuration comprises:
a third indication to enable a single transport block (TB) scheduling across multiple transmission occasion for a physical channel; and
a fourth indication of a number of transmission occasion over which a single transport block is transmitted, received, or a combination thereof.

17. The processor of claim 16, wherein the physical channel is a physical uplink shared channel (PUSCH).

18. The processor of claim 16, wherein the physical channel is a physical uplink control channel (PUCCH).

19. The processor of claim 16, wherein, if the TDW duration is not configured, then the TDW duration is implicitly determined.

20. The processor of claim 19, wherein the TDW duration is determined based on a number of contiguous time-domain symbols across multiple transmission occasions.

* * * * *